April 18, 1939.　　　　G. R. BOND, JR　　　　2,154,434
METHOD AND APPARATUS FOR THE REFINING OF VISCOUS HYDROCARBON OIL
Filed Aug. 27, 1935　　　2 Sheets-Sheet 1
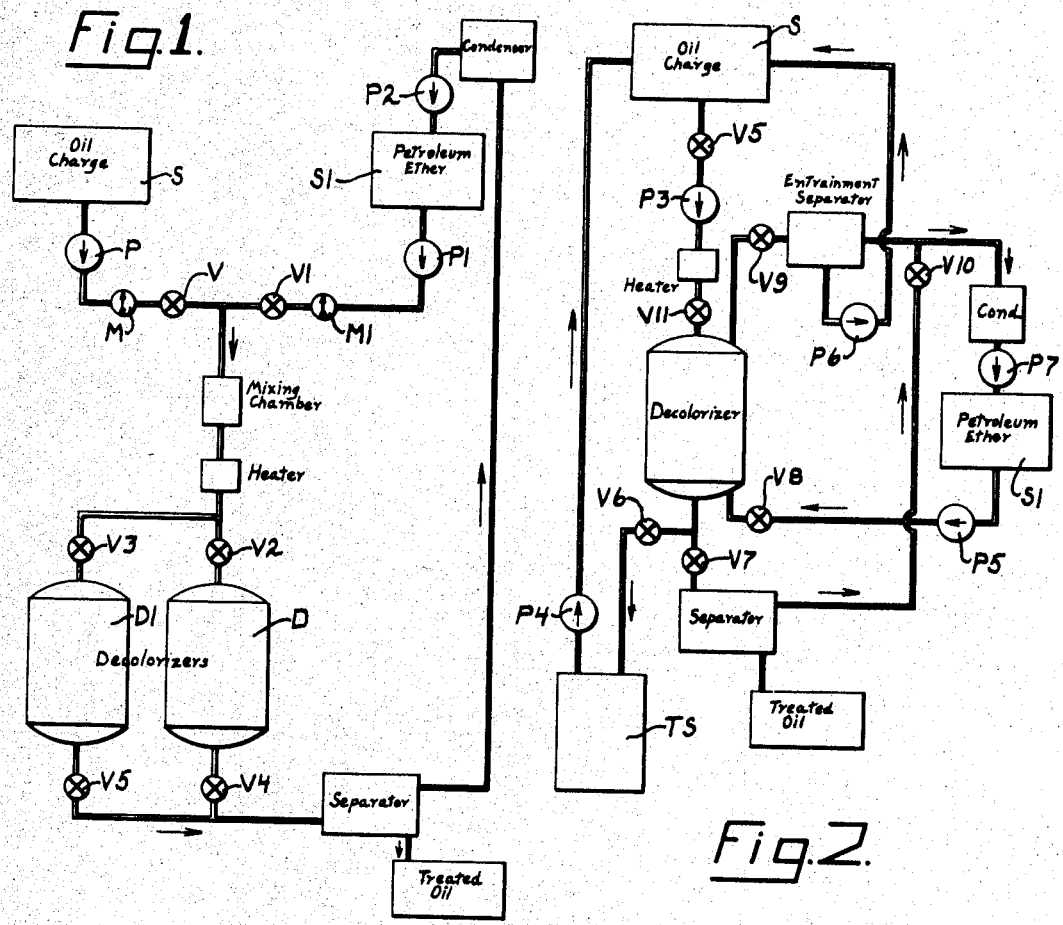
Fig.1.
Fig.2.
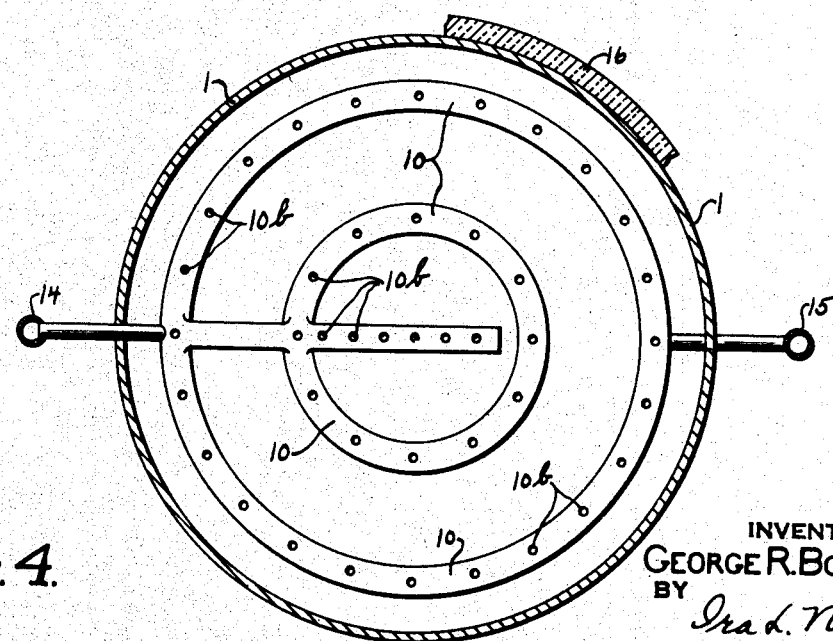
Fig.4.
INVENTOR
GEORGE R. BOND JR.
BY
Ira L. Nickerson
ATTORNEY Patented Apr. 18, 1939

2,154,434

UNITED STATES PATENT OFFICE 2,154,434

METHOD AND APPARATUS FOR THE REFINING OF VISCOUS HYDROCARBON OIL

George R. Bond, Jr., Paulsboro, N. J., assignor to Houdry Process Corporation, Dover, Del., a corporation of Delaware Application August 27, 1935, Serial No. 38,023

6 Claims. (Cl. 196—147)

This invention relates to the art of treating fluids by passing them in contact with a solid material to remove undesirable components therefrom. It has special application to the decolorization and purification of petroleum fractions suitable for use as lubricating oils.

It has been suggested in the past that petroleum oils of the lubricating range may be decolorized by filtration of the oil through beds of fuller's earth. In the course of operation, such beds become fouled or contaminated by the deposit therein of polymerized or adsorbed color-imparting and unstable or other bodies. To maintain or return such beds to an uncontaminated condition, it has been suggested that a liquid be passed through the bed, at least periodically, to remove deposited material therefrom, but always it has been necessary periodically to remove the filtration material from its container and free it from deposits which could not be otherwise removed, usually by burning, for example, in a Wedge roaster. Such regeneration, being necessarily uncontrolled or very roughly controlled, resulted in deterioration of the material as a decolorizing agent, further deterioration being occasioned by each such subsequent burning. Such regenerated material is commonly designated, in refinery terminology, as "once burned" clay, "twice burned" clay, etc., depending upon the number of regenerations. The more times such material has been regenerated, the more inferior it is understood to be, and, after being used following the third or fourth regeneration, it is usually considered not to be worth another regeneration.

It is an object of this invention to employ an adsorptive or decolorizing material in such form and under such conditions that it will serve as an effective decolorizing medium and will be capable of being regenerated in situ, i. e., without removing it from the tower or container in which it is held during the time when oil or other fluid is being contacted therewith. It is a further object of this invention to provide a system of decolorizing and regeneration whereby the desired properties of the contact material are not deleteriously affected, at least to any substantial extent, with each cycle of operation, including decolorization and regeneration. Other objects and advantages will appear from the description as a whole.

As my solid contacting agent I employ a material of substantially uniform void space throughout, or at least throughout each cross section thereof. By void space is meant the sum total of the spaces between the individual pieces making up the contact mass. A convenient way to arrive at uniform void space is to employ pieces or particles of substantially uniform size and preferably of uniform shape, or better still by employing two or more different sizes of particles. Uniformly sized particles may be arrived at by suitable methods of grading but also by molding the desired contact mass into pieces of desired dimensions, for example, such as described in Patent No. 1,837,971, issued to Alfred Joseph on December 22, 1931, and in the copending application of Eugene J. Houdry, Serial No. 600,581, filed March 23, 1932, (Patent No. 2,078,945, issued May 4, 1937) and molded particles need not necessarily be of annular shape but may consist of solid particles of cylindrical shape or other regular configurations, for example, which will provide a contact mass having void space of about the proportion provided where cylindrically shaped particles or pastilles are employed, or at least generally comparable thereto. Particles of my contacting agent, when in cylindrical form, may be 2-4 mm. in diameter, or thereabouts, for example, and any suitable length, e. g., 2-6 mm. Void spaces of the order of 30 to 50%, more or less, of the total volume of the mass or bed of contact material, and substantially uniform throughout each cross section of the bed of contacting agent, transverse to the direction in which oil or other fluid is passed therethrough, are contemplated.

Where the contacting agent is to be used as a decolorizing material for petroleum fractions of the lubricating oil range, or similar materials, it may consist of various adsorbent materials which possess the property of removing undesirable components, such as color bodies, from such oil fractions by polymerization, adsorption, or otherwise. Examples of such materials are: argillaceous hydrosilicates of alumina, hydrosilicates of alumina or blends of silica and alumina which are non-argillaceous but which may have an argillaceous binder, fuller's earth with a binding material such as plastic clay, silica gel, or other materials, whether of a clayey nature or not, known to have the desired effects, which are also capable of being obtained as particles of suitable dimensions, or formed or molded into particles or pastilles of suitable size and shape.

Materials of such high void space, even though they have good adsorbent or other necessary characteristics ordinarily, or at least often, will not function efficiently for the purpose desired without the aid of an auxiliary agent, for example, a liquid or gaseous fluid. This particularly true in the purification and decolorization with a solid material or agent of high void space, such as those discussed above.

The operation may be continuous, except for periodic intervals for regeneration, or it may be carried out as a batch process.

The invention may be further illustrated by reference to the accompanying drawings in which:

Fig. 1 shows a flow diagram for a continuous decolorizing process;

Fig. 2 shows a flow diagram for a batch process of decolorization;

Fig. 4 is a plan view of a section taken through Fig. 3, which shows in detail a unit or member for introducing or withdrawing regeneration fluid, such as air or gaseous products of combustion, respectively.

Figure 3:
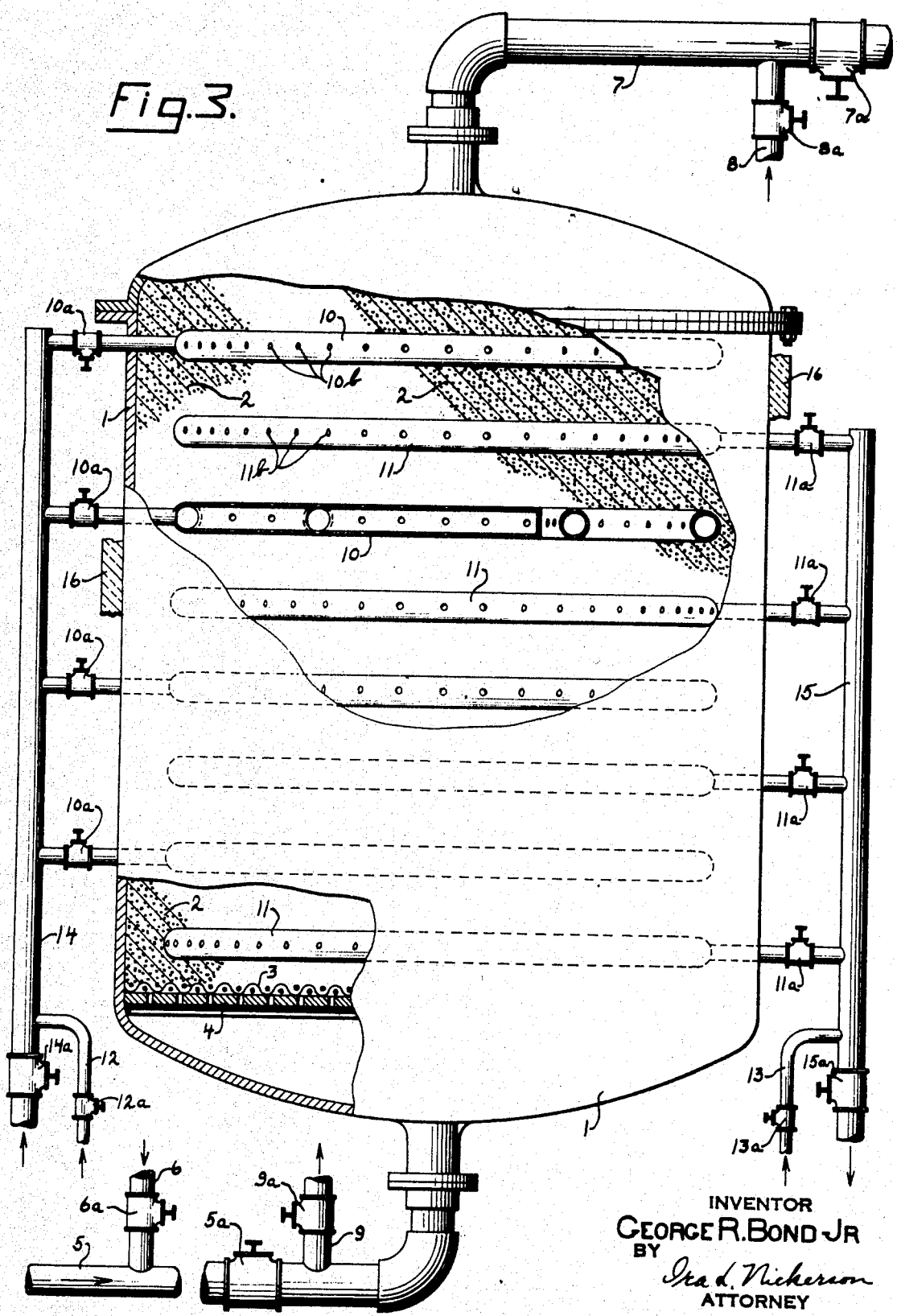
Fig. 3 shows suitable apparatus for carrying out such a process, particularly of the continuous type, and for regeneration of the solid decolorizing material.

The drawings will now be analyzed in detail and the treatment of a particular material, viz., petroleum oil of the lubricating range, will be discussed, by way of specific illustration.

A continuous process is illustrated by Fig. 1. Oil is pumped from storage S by pump P through meter M and valve V into the mixing chamber indicated. Petroleum naphtha, especially light naphtha, e. g. petroleum ether and, which may include propane or butane, is pumped from storage S1 by pump P1 through meter M1 and valve V1 into the mixing chamber indicated, the pressure maintained being sufficiently high to hold the petroleum ether substantially completely in liquid form. Meters M and M1 serve to guide the proportioning of oil to petroleum ether as desired. Of course, it is always desired to use the lowest proportion of propane or petroleum ether which will give the desired degree of decolorization with the particular bed of material employed.

From the mixing chamber the mixture of oil and petroleum ether is passed to the heater shown and from there through either valve V2 or V3 into decolorizer D or D1, respectively, which contains, for example, hydrosilicate of alumina in the form of molded pastilles. One decolorizer is normally out of circuit while the other one is being used. Treated oil leaves decolorizer D or D1 through valve V4 or V5, respectively, and passes to the separator shown where petroleum ether is separated from treated oil, the former being passed to the condenser, shown, and from there, by means of pump P2, reintroduced into petroleum either storage, while the latter is passed to treated oil storage.

My invention may be illustrated in connection with a batch process of decolorization by referring to Fig. 2. Oil charge is pumped from charging tank or storage S through valve V5 by pump P3 and thence through the heater and valve V11 into the decolorizer, which contains a decolorizing bed of material, for example as above described. During this introduction of oil charge (usually at atmospheric temperature or above) valves V6, V7 and V8 are closed. Oil is allowed to stand in the decolorizer until it soaks into the pores of the decolorizing bed, i. e., until the bed becomes saturated with absorbed oil, which may take 15 minutes, more or less, for example. Then valve V6 may be opened and the unabsorbed oil drained into temporary storage tank TS, from which it may be intermittently returned to oil storage S by pump P4. There will be left in the decolorizer a bed of material saturated with oil with no free or unabsorbed oil in the interstices thereof.

An alternative procedure up to this point is to fill the bed of material with charging oil and then to withdraw a part so as to allow oil to stand in the bed to a certain level as ½ to ¾ of the height of the bed, depending upon the quantity of petroleum ether to be injected, thereby providing for expansion of the latter. The proportions by weight of petroleum ether to oil which have given desirable results in practice are 1 to 2, 1 to 1, 1.7 to 1, 2 to 1, or 3.6 to 1, but other proportions in or near this range may be used.

Now, with valves V6, V7, V9 and V11 closed, petroleum ether is passed from storage S1 by pump P5 through valve V8 into the decolorizer. The pumping of naphtha, petroleum ether, or the like, into the decolorizer is continued until a pressure is built up sufficient to keep the petroleum ether substantially in the liquid phase under the temperature and other conditions which obtain. This may be require a pressure of 100 or 150 lbs./sq. in., for example. The decolorizer is maintained under such pressure for a period of a few minutes to two or three hours. The minimum amount of time, beyond which no further substantial decolorization will occur, must be ascertained by trial or experimentation. When this period has elapsed, with valves V6, V7, V8 and V11 closed, petroleum ether is exhausted through valve V9 and passes through the entrainment separator shown, where entrained oil is removed and returned by pump P6 to charging tank or storage S. The exhausted petroleum ether passes through the condenser and is reintroduced into petroleum ether storage S1, if necessary by the action of pump P7.

This operation, i. e., injection of petroleum ether and after a period of time exhausting it, may be repeated one or more times if required to reduce the color of the oil to that desired. Three such injections should be adequate in most any case; whereas a single injection may be sufficient in many cases, particularly where unabsorbed oil is drained from the void spaces of the bed of decolorizing material prior to injection of petroleum ether.

At the end of the last period during which petroleum ether is held under pressure in the decolorizer it is not exhausted through valve V9 but, rather, valves V6, V8, V9 and V11 are kept closed and valve V7 is opened, allowing petroleum ether and oil to pass therethrough into the separator, from which the oil passes to the treated oil tank and petroleum ether passes through valve V10 to the condenser and back into petroleum ether storage S1.

By discharging from the bottom of the decolorizer, where petroleum ether is present in liquid form, the major portion of oil can be ejected therefrom. After the initial discharge, the discolorizing bed may be flushed with naphtha or additional quantities of petroleum ether to remove more completely the oil from the bed of decolorizing mass.

The regeneration of the bed of decolorizing material of high void space, which is an important consideration in this invention, can readily be understood from the apparatus shown in Fig. 3. A complete cycle of operation, including a decolorization step followed by a regeneration step, will be described.

1 is a casing or chamber, such as shown in

Figures 1 and 2, containing a decolorizing mass 2 supported therewithin on a suitable screen 3 and grid 4. Oil and petroleum ether are supplied in any suitable proportions, through lines 5 and 6 respectively, by controlling valves 6a and 5a. The mixture enters the bottom of chamber 1 and passes up through the decolorizing mass 2 and is emitted in refined or decolorized state through line 7 and valve 7a. All other valves are closed during the decolorization step. Passage of oil is continued until the material 2 becomes coated or contaminated to such an extent that oil emerging through line 7 is not sufficiently decolorized or treated.

Then the flow of oil and petroleum ether is cut off and absorbed oil may be washed from the decolorizing mass 2 by introduction of naphtha through conduit 8 and valve 8a and by withdrawing oil-naphtha solution through conduit 9 and valve 9a, all the other valves being closed.

Now valves 8a and 9a are closed and valves 10a and 11a, controlling the leads to interspersed members 10 and 11 respectively, are opened. Members 10 and 11, as shown in Figure 4, consist of two perforated concentric annuli and a perforated straight tube extending in on a diameter thereof. Next, valves 12a and 13a, in steam supply lines 12 and 13, are opened. Steam passes into and through manifolds 14 and 15 into annular members 10 and 11, having perforations or openings 10b and 11b, through which the steam emerges, carrying from such members any oil which has settled therein during the decolorizing step. The steam then passes through and in contact with decolorizing mass 2 and may be withdrawn through valve 9a, 8a or 7a, as desired. When the steam leaving chamber 1 no longer carries appreciable amounts of oil or naphtha with it, all the valves are closed, except valves 10a and 11a and valves 14a and 15a are opened. Air or other oxygen-containing gas is introduced at controlled temperature through valve 14a and through the connections shown into perforate, annular members 10, from which it is introduced into the decolorizing mass in a state of substantially uniform distribution. Products of combustion enter corresponding, interspersed members 11 through openings 11b and are led away by manifold 15 through valve 15a.

Where the temperature of the decolorizing bed happens to be below that at which combustion can be commenced when a decolorizing operation is completed, it may be brought up to the desired level by passing steam, or flue gas, of sufficiently high temperature therethrough, as during the steaming out operation, or it may be otherwise heated.

When the chamber and decolorizing mass are up to regeneration temperature, the oxygen bearing gas is introduced at a temperature sufficiently low to compensate for the exothermic heat of regeneration, or other control means such as an independent cooling fluid may be utilized thereby to prevent the temperature of the mass from exceeding the range to which such mass may be subjected without substantial depreciation in its decolorizing properties. By way of example, where the decolorizing mass consists of molded particles of certain hydrosilicates of alumina, the temperature reach during regeneration should not exceed 900 to 1200° F., the lowest temperature at which regeneration will proceed at a reasonably expeditious rate being preferable. The walls of casing or chamber 1 are covered with insulation 16, so as to aid in keeping the temperature of the mass uniform throughout the horizontal and vertical cross-sections of the chamber. If desired, the casing may be surrounded with a confined annular passageway, through which a temperature controlled fluid may be circulated.

When regeneration is completed, as can readily be determined by an analysis of the exit gases for $CO_2$ or CO, valves 14a and 15a are closed and the lines and chamber are steamed out to purge them of air or oxygen before the next decolorizing step is commenced.

It is optional to have water tubes within some or all of members 11, for example, through which water (or low temperature steam) may be circulated during regeneration to withdraw part of the exothermic heat developed, thereby to permit more rapid regeneration.

Where a system of decolorization and regeneration, as above illustrated, is employed, a decolorizing mass may be used over and over again, only slight, if any, deterioration resulting from each regeneration. In addition, the mass may be regenerated without removing it from the decolorizing chamber. The high and uniform porosity of the decolorizing mass and the uniform supply of regenerating medium and withdrawal of products of combustion are important factors making possible regeneration of the mass in situ.

While the apparatus of Fig. 3 is discussed in connection with a continuous process of extraction, by slight modification thereof with regard to ducts and valves, according to the instruction of the flow diagram of Fig. 2, it is obvious that the same apparatus may be used for batch treatment or decolorization.

Petroleum naphtha or ether, especially light naphtha and particularly propane and butane, are discussed and particularly contemplated as the auxiliary agent capable of making a mass adapted for regeneration in situ function efficiently as decolorizing material. However, the invention is not limited to such auxiliary agent and any other may be employed, any type of auxiliary agent or treating or decolorizing operation, where the mass may be regenerated in situ, being contemplated.

The temperature employed during decolorization may be, for example, atmospheric or above, temperatures as high as 600° F. sometimes being employed, although intermediate temperatures, for example, atmospheric to 400° F. are the ones more commonly employed. The temperature must be below the critical temperature of the petroleum ether or other gaseous auxiliary agent, i. e., below the temperature at which such agent will be a permanent gas, under the pressure conditions which exist. Superatmospheric pressures of the order of 100 or 150 lbs. per sq. in. are commonly employed.

Ratios of petroleum ether to oil, by weight, may, for example, be from .5 to 1 up to about 4 to 1, intermediate ratios, such as 1.5 to 1 or 3 to 1, being exemplary.

It is to be understood that the specific treatments described herein bear no limitation upon this invention, or upon the class of fluids which is contemplated to be treated according to it.

Where in the appended claims the auxiliary fluid agent, hereinabove illustrated, is described as being "at least as low boiling as naphtha", it will be understood to define hydrocarbon fluids capable of being employed as aids in decolorozing processes, including especially hydrocarbons boiling within the range of propane to heptane and being directed especially to hydrocarbons boiling predominantly, if not wholly, below about 100° C.

What I claim is:

1. In refining and decolorizing a petroleum oil of the lubricating range, the process which comprises passing such oil through a bed of decolorizing material, said bed of material being made up of an adsorptive blend of silica and alumina molded into pieces or pastilles of regular sizes and shapes to provide large sized void spaces throughout the said bed of material, said void spaces constituting from 30 to 50% of the total volume of said bed of material, so as to prevent channeling and to permit uniform regeneration in situ of such bed of material, passing an auxiliary fluid agent capable of effecting removal of undesirable components including color bodies, comprising a hydrocarbon fluid which is at least as low boiling as naphtha, namely boiling within the range from the boiling point of heptane down to and including that of propane, through said bed of decolorizing material in admixture with the petroleum oil to be decolorized, and at intermittent periods interrupting the passage of oil and auxiliary fluid and regenerating said bed of material in situ to remove solid combustible deposits therefrom.

2. In the art of treating a viscous hydrocarbon oil of the lubricating range to remove undesirable components therefrom and to control the color of the same, the steps of process which comprise passing it in contact with a bed of solid adsorbent decolorizing material made up of silicious material molded into pieces or pastilles of regular size and shape to provide large sized void spaces to the extent of approximately 30 to 50% of the total volume of said bed of material and being capable of removing undesirable components from said oil, said contact material being maintained within a confined reaction zone, passing an auxiliary fluid agent capable of removing color-imparting bodies, comprising a hydrocarbon fluid which is at least as low boiling as naphtha as herein defined, through said bed of decolorizing mass along with the petroleum oil to be decolorized, said zone being maintained under a sufficiently high pressure so that said auxiliary fluid agent will be maintained predominantly in the liquid phase, and intermittently interrupting the passage of oily and auxiliary fluid into said zone and regenerating said bed of material in situ by passing an oxygen-containing gas therethrough at suitable temperature, and repeating the above steps of process.

3. In refining and decolorizing a fluid hydrocarbon oil of the lubricating range, the process which comprises passing such oil through a bed of solid adsorbent decolorizing material, said bed being made up of silicious material molded into pieces or pastilles of regular sizes and shapes to provide large sized void spaces throughout said bed of material so as to prevent channeling and to permit uniform regeneration in situ of such bed of material, said void spaces being of the order of 30 to 50% of the total volume of said bed of material, passing an auxiliary fluid agent capable of effecting removal of colored or chemically unstable bodies, comprising a hydrocarbon fluid which is at least as low boiling as naphtha, through said bed of decolorizing material along with the hydrocarbon oil to be decolorized while maintaining the mixture of oil and fluid hydrocarbon agent under sufficient superatmospheric pressure to keep the latter substantially in the liquid phase, the proportion of auxiliary hydrocarbon agent to oil being of the order of 0.5:1 up to 4:1, periodically regenerating said bed of contact material in situ by temporarily interrupting the flow of hydrocarbons and passing an oxygen-containing regenerating fluid therethrough; upon completion of the regenerating step, again passing said hydrocarbon oil and auxiliary agent through said bed of solid decolorizing material as above described, and repeating the aforesaid step of process.

4. In refining and decolorizing a fluid petroleum oil of the lubricating range, the process which comprises maintaining a bed of solid decolorizing material within a confined zone, said material being made up of adsorbent silicious material molded into pieces or pastilles of regular sizes and shapes to provide large sized void spaces throughout the bed of material making up approximately 30 to 50% of the volume of the latter so as to prevent channeling and to permit uniform regeneration in situ of such material, saturating said bed of material with oil to be refined and decolorized, introducing into said confined zone a low-boiling auxiliary fluid agent under sufficient superatmospheric pressure to maintain said agent substantially in liquid phase for precipitating colored or chemically unstable bodies, after a period of time exhausting said fluid agent from said zone by releasing the pressure thereon, again introducing more of said agent under sufficient superatmospheric pressure and in liquid phase condition into said confined zone in contact with said oil, and finally flushing said oil from the bed of material within said confined zone, the said auxiliary fluid agent comprising a hydrocarbon fluid which is at least as low boiling as naphtha, and the repeated injections of the said auxiliary fluid agent serving to expedite contact of all portions of the oil with the said decolorizing material.

5. Apparatus adapted for decolorizing and treating a viscous hydrocarbon oil to remove undesirable components therefrom which comprises a casing providing a reaction chamber, a bed of solid contact material capable of removing undesirable constituents from said oil, made up of adsorptive silicious material molded into pastilles of regular size and shape and providing large sized and substantially uniform void spaces throughout each cross section thereof, located within said chamber, said void spaces being of the order of 30 to 50% of the total volume of said bed of contact material, a conduit for the induction of oil communicating with said chamber adjacent one end thereof and a conduit for the eduction of oil communicating with said chamber adjacent the other end thereof, means for continuously introducing a mixture of oil and an auxiliary fluid in controlled proportions into said chamber through the said induction conduit, means comprising a liquid-gas separator joined to said eduction conduit for continuously separating the auxiliary fluid from oil leaving said chamber, and means including pumps for continuously recycling said auxiliary fluid under sufficient pressure to maintain it predominately in liquid phase, together with a stream of fresh oil, into said chamber through said induction conduit.

6. Apparatus adapted for decolorizing and treating a viscous hydrocarbon oil to remove undesirable components therefrom which comprises a casing providing a reaction chamber, a bed of solid contact material capable of removing undesirable constituents from said oil, made up of hydrosilicate of alumina molded into pastiles of regular sizes and shapes so as to provide large sized void spaces which are substantially uniform throughout each cross section of said bed of material, located within said chamber, said void spaces making up from 30 to 50% of the total volume of said bed of contact material, valved conduits for the induction of oil into and its eduction from said chamber connected to the latter, a valved conduit communicating with said chamber and with means for introducing a normally gaseous auxiliary hydrocarbon fluid therethrough into said chamber under sufficient superatmospheric pressure to maintain it in liquid phase, and means adapted and located so as periodically to exhaust auxiliary fluid as a gas from said chamber without exhausting the oil therefrom.

GEORGE R. BOND, Jr.